United States Patent [19]

Zweekly

[11] 4,357,123

[45] Nov. 2, 1982

[54] INSERT RETENTION APPARATUS

[75] Inventor: Raymond T. Zweekly, Royal Oak, Mich.

[73] Assignee: The Valeron Corporation, Troy, Mich.

[21] Appl. No.: 182,224

[22] Filed: Aug. 28, 1980

[51] Int. Cl.³ .............................................. B26D 1/00
[52] U.S. Cl. ..................................... 407/110; 407/117
[58] Field of Search ............... 407/109, 110, 111, 106, 407/117, 93; 83/838, 839, 845

[56] References Cited

U.S. PATENT DOCUMENTS

| 207,003 | 8/1878 | Berry | 83/845 |
|---|---|---|---|
| 341,187 | 5/1886 | Timmons | 83/845 |
| 1,104,980 | 7/1914 | Fry | 407/111 |
| 1,480,987 | 1/1924 | Britt | 407/111 |
| 1,484,332 | 2/1924 | Jaques | 407/111 |
| 2,982,009 | 5/1961 | Swenson | 407/50 |
| 3,500,522 | 3/1970 | Stier | 407/111 |
| 3,500,522 | 3/1970 | Stier | 407/106 |
| 3,523,349 | 8/1970 | Pollington et al. | 407/110 |
| 3,655,969 | 4/1972 | Pollington et al. | 407/110 |
| 3,894,322 | 7/1975 | Pano | 407/110 |
| 3,980,443 | 9/1976 | McCreery | 407/106 |
| 4,257,302 | 3/1981 | Heimbrand | 407/106 |

FOREIGN PATENT DOCUMENTS

| 129868 | 2/1978 | Fed. Rep. of Germany | 407/50 |
|---|---|---|---|
| 2755003 | 6/1978 | Fed. Rep. of Germany | 407/109 |
| 1393181 | 2/1965 | France | 83/838 |
| 120050 | 8/1927 | Switzerland | 83/839 |
| 422295 | 4/1967 | Switzerland | 83/839 |
| 935750 | 9/1963 | United Kingdom . | |

Primary Examiner—Leonidas Vlachos
Attorney, Agent, or Firm—Gordon K. Harris, Jr.

[57] ABSTRACT

A support blade for a cutting tool insert is disclosed featuring a unitary clamping arrangement for the insert actuated by a camming member permanently positioned in the blade.

9 Claims, 5 Drawing Figures

INSERT RETENTION APPARATUS

BACKGROUND OF THE INVENTION

1. Field of the Invention

The invention relates generally to insert retention or clamping arrangements. More specifically the invention pertains to a support and clamping blade for a metal cutting insert of a cut-off or parting tool.

2. Description of the Prior Art

Inserts for performing metal cutting operations such as cutting off and grooving are typically held in operative position by relatively narrow support blades which are, in turn, clamped in dove-tailed holders attached to the machine tool. These prior art support blades are typically provided with an elongated slot for locating mating surfaces of the insert whereby the insert cutting edge extends ahead of a leading edge of the support blade. The most pertinent prior patents known to the inventor disclosing such support blades are U.S. Pat. Nos. 3,894,322—Pano, 3,785,021—Norgren, 3,775,818—Sirola, 3,748,710—Lynch, 3,655,969—Pollington et al., and 3,523,349—Pollington et al.

Cut-off tools are also known in the art that feature cams for locking a cutting tool insert in place. The most pertinent prior patents in this area known to the inventor are U.S. Pat. Nos. 2,293,006—Luers, 2,343,855—Luers, 2,223,831—Luers, 1,480,938—Britt, 1,458,973—Bufford, 1,169,594—Amborn, 1,112,185—Amborn, 1,110,281—Amborn, and 1,090,810—Amborn.

In general, the first group of patents listed above teaches use of an insert support blade having an insert locating aperture with clamping performed either by spring biased action of a portion of the blade itself or by use of relatively complex non-unitary clamping actuators operating in conjunction with a sawcut in the blade. Those prior art disclosures with no separate clamp actuators typically rely on cutting forces to hold the insert in operative position. Such an approach can lead to insufficient insert retention capability when such tools are used, for example, in an inverted operating position. The separate clamping actuators disclosed in others of these prior art patents are complex in shape and therefore expensive to manufacture and, additionally, do not typically conform to the narrow thickness dimension of the support blade thereby presenting clearance problems. Another disadvantage found in some of these prior art devices is the necessity for a special tool for inserting or releasing cutting inserts clamped by the support device disclosed.

The second group of patents listed above generally teaches use of cams to effect insert locking in a locating slot in a blade or other type insert holder. However, the disclosed arrangements utilize cams bearing directly on the cutting elements. This approach leads to undesirable forces being exerted directly onto the cam surfaces, which can lead to damaging wear thereof. Additionally, with the disclosed cams, cutting forces on the inserts or blades held by said cams tend to cause reverse actuation of the camming elements used.

SUMMARY OF THE INVENTION

It is therefore an object of this invention to provide insert retention in a narrow insert support blade in a manner overcoming the above deficiencies in prior art approaches.

To this end, a support blade for a cut-off tool insert includes a first aperture shaped for mating engagement with the insert. A second aperture is positioned in the blade to provide a flexible portion of support blade material generally bounded by the first and second apertures, an opening extending between lateral surfaces of the blade communicating with the second aperture and shaped to hold a similarly-shaped camming member operative on either clockwise or counterclockwise rotation to bear against an opposing surface of the second aperture to thereby, via the flexible portion of the blade material, force opposing surfaces of the first aperture toward one another to exert clamping force on the insert seated therein.

DRAWING

The objects and features of the invention will become apparent from a reading of a detailed description of an embodiment of the invention taken in conjunction with the drawing in which.

DETAILED DESCRIPTION

Figure 1:
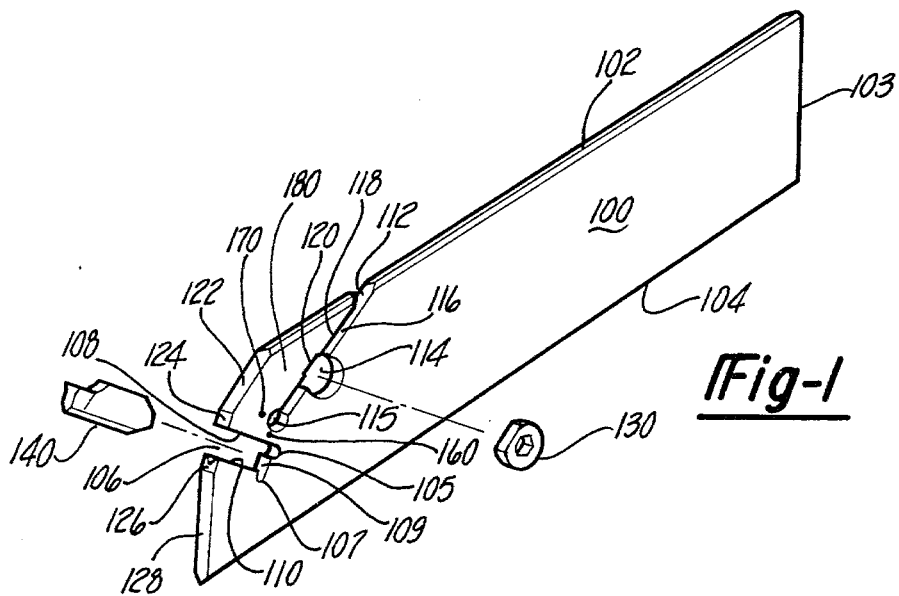
FIG. 1 is a perspective view of a support blade, cutting insert, and camming member, each arranged in accordance with the principles of the invention.

With reference to FIGS. 1–5 of the drawing, the same reference numerals are used for the same component or portion of the apparatus depicted in the various figures.

Figure 2:
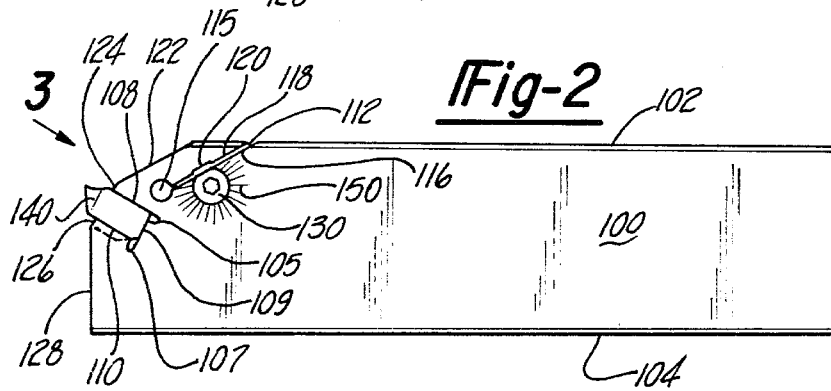
FIG. 2 is a side view of the assembled apparatus of FIG. 1.

As seen from FIG. 1 and FIG. 2, a support blade 100 for a cut-off tool insert 140 is of relatively narrow thickness and generally rectangular when viewed from a side, as seen from FIG. 2. Support blade 100 is bounded by "V" shaped top and bottom edge surfaces 102 and 104, respectively, by a substantially flat rear surface 103 and by substantially flat front surface segments 122, 124, 126 and 128. Segment 128 is substantially perpendicular to top and bottom edge surfaces 102 and 104, while segments 124 and 126 lie in a plane relieved from the frontal plane of the support bar. Segment 122 joining segment 124 with the top surface 102 is relieved still further in a rearward direction to provide proper clearance when insert 140 is engaged in a cut-off operation.

Support bar 100 includes a first aperture 106 opening between the segments 124 and 126 and shaped for locating mating surfaces of insert 140. Aperture 106 includes substantially planar upper and rear surfaces 108 and 109, respectively, and a lower surface 110 having converging sides of a general V shape design generally conforming to mating surfaces at the bottom edge of insert 140 (see FIG. 3). In the preferred embodiment shown, aperture 106 is therefore seen to comprise a generally rectangular slot having a longitudinal axis normal to its rear surface 109 that intersects a longitudinal axis of the support bar 100 at a forwardly facing angle in the order of 30 degrees. To facilitate proper insert seating at rear surface 109 of slot 106, undercuts 105 and 107 are provided at the juncture of the rear slot surface 109 with slot surfaces 108 and 110, respectively.

With continued reference to FIGS. 1 and 2, support blade 100 is further provided with a second aperture 112, positioned, in the preferred embodiment depicted, above and rearwardly of the insert locating aperture 106. The preferred form of aperture 112 is a narrow sawcut or slit having substantially parallel upper and lower surfaces 116 and 118, and terminating in undercut 115. Slit 112 forms a rearwardly facing angle in the order of 30 degrees with a line parallel to the longitudinal axis of support blade 100.

Support blade 100 is further provided with an opening 114 extending between the lateral surfaces of the blade and located such that it communicates with slit opening 112 at a region approximately half way between the slit opening at top blade edge 102 and the slit's inner terminus at undercut 115. A slightly relieved bearing surface 120 is provided in the upper surface 118 of slit 112 opposite the intersection of opening 114 and slit 112. It is also seen that opening 114 has a circular periphery terminating at slit 112 in a chord-like manner.

With the relative positioning of insert locating slot 106 and slit 112 as shown, a portion of support blade material 180, generally bounded by frontal surfaces 124 and 122, top surface 102, and surfaces 108 and 118, is provided that is flexible in the transverse plane of support blade 100.

Figure 5:
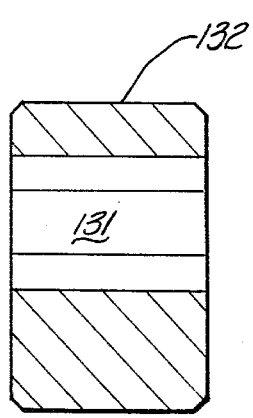
FIG. 5 is a sectional view taken along line 5—5 of FIG. 4.
Figure 4:
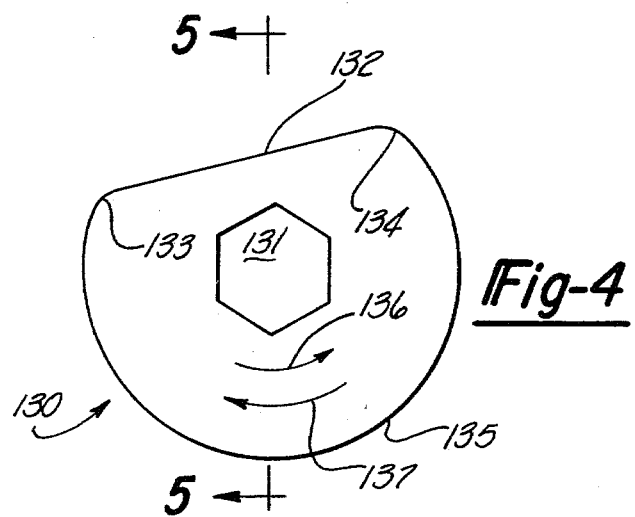
FIG. 4 is an axial view of the camming member of FIGS. 1 and 2.

Acutating means for flexible portion 180 of support blade 100 comprises a camming member 130 (shown in more detail in FIGS. 4 and 5). Camming member 130 has a thickness substantially equal to that of support blade 100 and is shaped for close rotative engagement with the periphery of opening 114 and relief area 120 of slit surface 118. Camming member 130 is substantially permanently mounted in opening 114 by peening of the lateral faces of support blade 100 in the vicinity of the periphery of opening 114, as shown, for example, by hash marks 150 in the lateral view of FIG. 2. However, member 130 could be replaced at a later time by punching out the member, inserting a new camming member, and reconditioning (e.g. by peening) the blade surface surrounding opening 114.

With reference to FIGS. 4 and 5, camming member 130 has a periphery in the shape of a flattened circle, the circular segment 135 joining the substantially linear segment 132 at points 133 and 134. Circular segment 135 is of substantially the same radius as the circular periphery of opening 114. Camming member 130 further includes hexagonal socket 131 sized for receipt of a standard size hexagonal wrench. Hence, no special purpose tooling or device is necessary in actuating the camming member to effect insert clamping to be described below.

When seated in opening 114 with its flatted segment 132 positioned in and substantially parallel to the longitudinal axis of slit 112, camming member 130 clears bearing surface portion 120 of slit upper surface 118, and no clamping force is generated. Upon rotation of the camming member from this neutral, or non-force-transmitting, position in either clockwise or counterclockwise direction (arrows 136 or 137, respectively of FIG. 4), a radiused portion of camming member surface 135 bears against surface 120 thereby flexing support blade portion 180 in a manner tending to force a portion of upper slot surface 108 towards lower slot surface 110. Hence if a mating cut-off insert 140 has been previously placed in slot 106, rotation of camming member 130 from its neutral position past either of points 133 or 134 results in a clamping force on the insert transmitted via flexible portion 180. At the initiation of the clamping force transmission, blade portion 180 flexes about approximately point 160 until a portion of surface 108 bears against insert 140. Further slight rotation of camming member 130 will then result in flexing of blade portion 180 about approximately point 170 which results in a force tending to wedge the camming member 130 into a locked clamping position.

Figure 3:
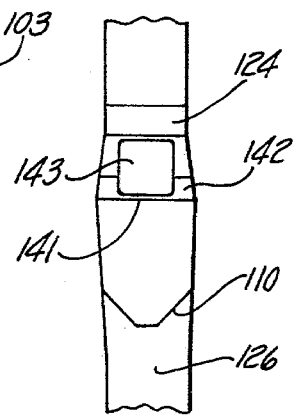
FIG. 3 is a sectional view taken along line 3 of FIG. 2.

The essential features of a typical insert usable with the support blade disclosed in accordance with the principles of the invention are demonstrated in more detail in FIGS. 2 and 3. Insert 140 has a rear surface in substantially mating engagement with rear slot surface 109, thereby providing a positive stop for insert 140, which allows for more accurate positioning of insert cutting edge 141. Insert 140 additionally includes a negative rake land 142 that strengthens cutting edge 141 thereby enabling greater feed rate capability than would be available in the absence of such a land. Additionally, land 142 enables a smoother finish-type cut surface to be generated during the cutting operation. At the top front portion of insert 140 rearward of cutting edge 141 and land 142 is a chip forming depression 143 which tends to narrow the width of the chips taken by cutting edge 141 to minimize chip jamming in the path of the cutting tool that is typically bounded on both lateral portions by the workpiece being machined.

It should be noted that the invention described herein has been illustrated with reference to the particular embodiment. It is to be understood that many details used to facilitate the descriptions of such a particular embodiment are chosen for convenience only and without limitation on the scope of the invention. Many other embodiments may be devised by those skilled in the art without departing from the scope and spirit of the invention. Accordingly, the invention is intended to be limited only by the scope and spirit of the appended claims.

I claim:

1. Apparatus for retaining a cutting tool insert with a cutting edge in operative position for engaging a workpiece, the apparatus comprising:

a support blade having two lateral surfaces spaced apart a distance at least as narrow as the length of the retained insert's cutting edge, a first aperture with upper and lower surfaces shaped for receipt of mating upper and lower surfaces of the cutting insert, a second aperture having first and second opposed surfaces, the second aperture positioned to provide a flexible but unitary portion of support blade material bounded by the first and second apertures, an opening extending between the two lateral surfaces and intersecting one of the first and second surfaces of the second aperture; and actuating means having substantially the same thickness as the distance between the two lateral surfaces and shaped for substantially permanent mating location in the opening, operative in either of two rotative directions to bear against that surface of the second aperture opposite the intersection with the opening to move oppositely facing portions of the upper and lower surfaces of the first aperture toward one another.

2. Apparatus as set forth in claim 1 wherein the first aperture comprises a slot having a rear surface substantially perpendicular to the longitudinal axis of the slot and an opening toward a front edge of the support blade, the rear surface of the slot providing a positive stop for a mating rear surface of an insert located in said slot.

3. Apparatus as set forth in claim 2 wherein the second aperture comprises a slit extending from a top edge of the support blade at a point generally rearward of the first aperture, the slit extending downwardly from its opening at the top edges of the blade and forwardly toward the first aperture, whereby the flexible portion of the support blade is formed between the upper surface of the slot, an upper surface of the slit, a segment of the top edge bounded by the slit opening and a front edge of the blade, and a segment of the front edge of the blade bounded by the upper surface of the slot and the top edge of the blade.

4. Apparatus as set forth in claim 1 wherein the actuating means includes a hexagonal cavity for receipt of a standard hexagonal wrench for imparting rotative motion thereto.

5. Apparatus as set forth in claim 3 wherein the opening has the shape of a circle subtended by the slit, the actuating means comprises a camming member having a first surface of substantially circular shape mating with a corresponding surface of the opening and a flatted portion located such that the camming member rests in the opening in a non-force-transmitting rotative position with the flat located in and substantially parallel to the longitudinal axis of the slit, and wherein the camming member bears against the upper surface of the slit when rotated from the non-force-transmitting rotative position in either of two rotative directions about the axis of the camming member.

6. Apparatus as set forth in claim 5 wherein the camming member is permanently seated in the opening for rotation therein by peening the lateral surfaces of the support blade around the periphery of the opening.

7. Apparatus as set forth in claim 3 wherein the longitudinal axis of the slot intersects a longitudinal axis of the blade at a forwardly facing angle in the order of 30 degrees.

8. Apparatus as set forth in claim 3 wherein the longitudinal axis of the slit intersects a longitudinal axis of the blade at a rearwardly facing angle in the order of 30 degrees.

9. A support member for a cut-off tool insert comprising a generally rectangular blade having a relatively narrow thickness compared to its length and width, such that the thickness is at least as narrow as a cutting edge length of the cut-off tool insert, a front edge of the blade having a relieved segment, an insert locating slot opening at the relieved segment and extending generally rearwardly and downwardly from the relieved segment, the slot having a longitudinal axis substantially normal to the relieved segment, the slot further having upper, lower and rear surfaces shaped for receipt of substantially mating surfaces of the cut-off tool insert having a cutting edge extending normal to side surfaces of the support blade and in front of the relieved segment, a slit having opposing upper and lower surfaces extending from an open end in a top edge of the support blade generally downward and towards the front edge of the support blade at an angle in the order of 30 degrees with a longitudinal axis of the support blade, an opening comprising a substantially circular hole running from one side surface of the blade to the other, positioned below the lower surface of the slit and subtended in chord-like fashion by the lower surface of the slit, a camming member having substantially the same thickness as the blade and shaped for substantially permanent mating location in the opening with a flatted surface located such that the camming member rests in the opening in a non-force-transmitting rotative position with the flatted surface located in and substantially parallel to the slit, the camming member operative upon rotation in either direction from its non-force-transmitting position to bear against the upper surface of the slit to force oppositely facing portions of the upper and lower surface of the insert locating slot toward one another thereby clamping the cut-off tool insert in operative position.

* * * * *